United States Patent
Berezowski et al.

(10) Patent No.: US 9,940,824 B2
(45) Date of Patent: Apr. 10, 2018

(54) SYSTEM AND METHOD OF SELF-MONITORING NOTIFICATION APPLIANCES

(71) Applicant: Honeywell International Inc., Morristown, NJ (US)

(72) Inventors: Andrew G. Berezowski, Wallingford, CT (US); Jesse J. Otis, North Haven, CT (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 67 days.

(21) Appl. No.: 14/657,223

(22) Filed: Mar. 13, 2015

(65) Prior Publication Data

US 2016/0267775 A1  Sep. 15, 2016

(51) Int. Cl.

| | | |
|---|---|---|
| G08B 29/00 | (2006.01) | |
| G08B 29/02 | (2006.01) | |
| H04M 19/04 | (2006.01) | |
| G08B 29/12 | (2006.01) | |
| G06F 11/22 | (2006.01) | |
| G08B 29/04 | (2006.01) | |
| G08B 29/10 | (2006.01) | |
| G06F 11/00 | (2006.01) | |
| G06F 11/30 | (2006.01) | |
| G08B 29/06 | (2006.01) | |

(52) U.S. Cl.
CPC .......... *G08B 29/02* (2013.01); *G08B 29/126* (2013.01); *H04M 19/04* (2013.01); *G06F 11/008* (2013.01); *G06F 11/22* (2013.01); *G06F 11/30* (2013.01); *G08B 29/04* (2013.01); *G08B 29/06* (2013.01); *G08B 29/10* (2013.01)

(58) Field of Classification Search
CPC ....................................................... G08B 29/10
USPC ....................................................... 340/506
See application file for complete search history.

(56) References Cited

U.S. PATENT DOCUMENTS

| | | |
|---|---|---|
| 7,242,292 B2 | 7/2007 | Berezowski et al. |
| 8,194,592 B2 | 6/2012 | Kore et al. |
| 8,228,182 B2 | 7/2012 | Orsini et al. |
| 2007/0115111 A1* | 5/2007 | Girouard .............. G08B 3/10 340/507 |
| 2008/0219458 A1* | 9/2008 | Brooks ................. H03G 3/32 381/57 |
| 2009/0212937 A1* | 8/2009 | Stamer ................. G08B 29/06 340/506 |
| 2010/0315224 A1* | 12/2010 | Orsini .................. G08B 29/126 340/516 |
| 2013/0082840 A1* | 4/2013 | Kumar ................. H04M 1/0202 340/540 |
| 2014/0340215 A1* | 11/2014 | Piccolo, III ............ G08B 29/12 340/514 |

(Continued)

OTHER PUBLICATIONS

Extended European search report from corresponding EP patent application 16158149.1, dated Jun. 22, 2016.

*Primary Examiner* — Benyam Haile
(74) *Attorney, Agent, or Firm* — Husch Blackwell LLP

(57) ABSTRACT

Systems and methods of self-monitoring notification appliances are provided. A self-monitoring notification appliance can include a notification device and a monitoring sensing device. The notification device can produce one or more signals, and the monitoring device can sense a visual and/or acoustic characteristic of the one or more signals to determine successful operation thereof.

5 Claims, 2 Drawing Sheets

(56) References Cited

U.S. PATENT DOCUMENTS

| | | | | |
|---|---|---|---|---|
| 2015/0085632 A1* | 3/2015 | Kiely | ............... | G11B 5/41 |
| | | | | 369/53.38 |
| 2016/0192458 A1* | 6/2016 | Keith | ............. | H05B 37/0209 |
| | | | | 315/291 |

* cited by examiner

SYSTEM AND METHOD OF SELF-MONITORING NOTIFICATION APPLIANCES

FIELD

The present invention relates generally to notification appliances. More particularly, the present invention relates to a system and method of self-monitoring notification appliances.

BACKGROUND

Notification appliances can include visible notification appliances that produce a visual notification, such as a strobe light, to a user and audible notification appliances that produce an audible notification, such as output from a transducer, to a user. These types of notification appliances can be used in security and fire systems, but require periodic testing to verify operation.

Some systems and methods to test notification appliances are known, but present disadvantages. For example, manual walk through tests are often very time consuming. Automated tests have included using visible light to determine successful operation. However, producing visible light when a notification appliance is not in alarm can be disturbing to occupants of the region in which the notification appliance is located.

In view of the above, there is a continuing, ongoing need for an improved system and method to test a notification appliance to verify operation.

DETAILED DESCRIPTION

Figure 1:
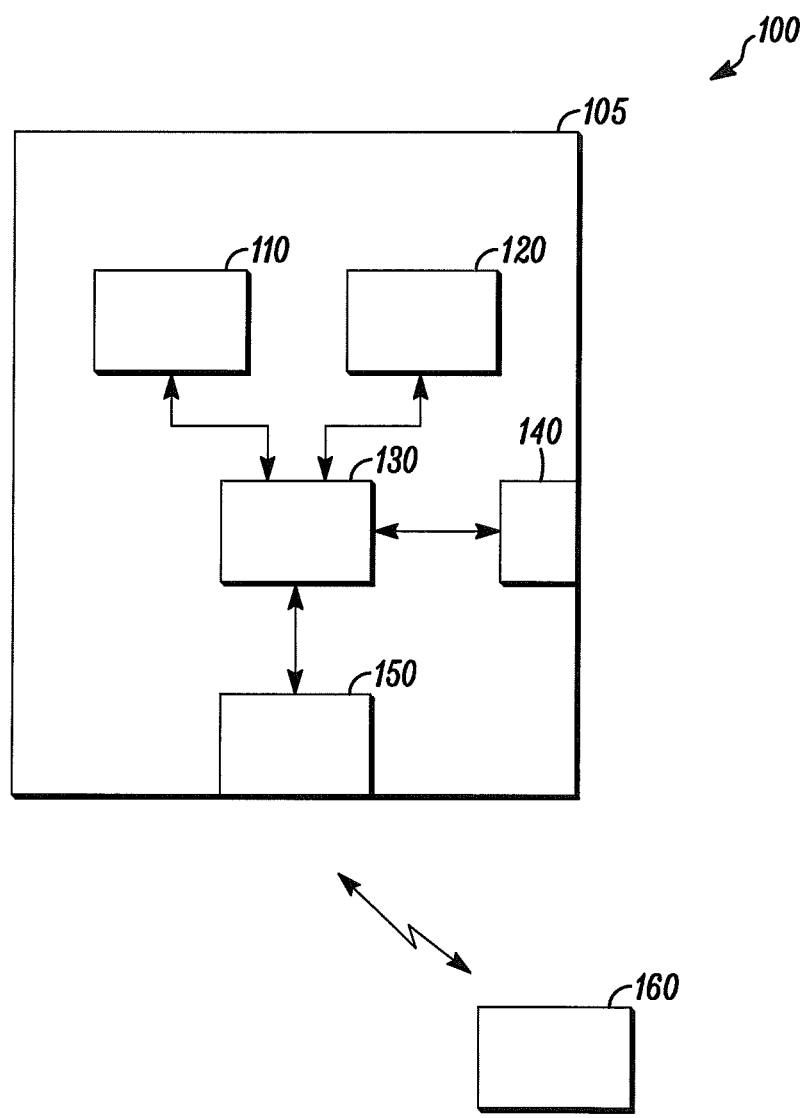
FIG. 1 is a block diagram of a notification appliance in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include a system and method of self-monitoring notification appliances. For example, a notification appliance disclosed herein can include a monitoring sensor that senses the operation of the notification appliance so that the notification appliance can report successful operation.

A visible notification appliance disclosed herein can include any one or combination of the following monitoring sensors to sense operation of the visible notification appliance: (1) a current sensing device, (2) a voltage sensing device, (3) a thermal sensing device, (4) an RF detector, (5) an acoustic sensing device, and (6) a magnetic sensing device. For example, the current sensing device can sense current in the visible notification appliance to determine when a visual device in the visible notification appliance is operating, for example, when a strobe light discharge has occurred. Similarly, the voltage sensing device can sense voltage in the visible notification appliance to determine when the visual device in the visible notification appliance is operating, for example, when the strobe light has flashed. The thermal sensing device can sense heat in the visible notification appliance to determine when the visual device in the visible notification appliance is operating, for example, when the strobe light has flashed. Furthermore, the RF detector can be configured to detect a RF signature of a visual light emission, for example, a strobe light discharge. The acoustic sensing device can detect sounds emanating from electronic circuit elements in the visible notification appliance that occur as a result of the visual light emission, for example, the strobe light discharge. Finally, the magnetic sensing device can be configured to detect an electric field produced by the visual light emission, for example, the strobe light discharge.

An audible notification appliance disclosed herein can include any one or combination of the following monitoring sensors to sense operation of the audible notification appliance: (2) a current sensing device, (3) a voltage sensing device, and (3) an acoustic sensing device. In some embodiments, the audible notification appliance can also include one or more filters to reject external noise. For example, the current sensing device can sense current in the audible notification appliance to determine when an audio device in the audible notification appliance is operating. Similarly, the voltage sensing device can sense voltage in the audible notification appliance to determine when the audio device in the audible notification appliance is operating.

In some embodiments, the acoustic sensing device can sense audio output of the audible notification appliance, including sound or vibration that is within or outside of a humanly audible frequency range. Furthermore, in some embodiments, the acoustic sensing device can sense output of a transducer of the audible notification appliance that is within or outside of the humanly inaudible frequency range to verify operation of the transducer.

In some embodiments, the acoustic sensing device can sense sound from transducers in other devices in an acoustic region to determine whether those devices are operating and/or to determine an ambient sound pressure level (SPL) for adjusting, when necessary and when activated, an output level of a local output transducer with respect to the measured ambient SPL. Furthermore, some embodiments disclosed herein can include using an audio output transducer of the audible notification appliance in a reverse manner. For example, in these embodiments, the acoustic sensing device can sense sound from the transducers in the other devices in the acoustic region to determine that the local output transducer being used in a reverse fashion is operational.

In some embodiments, the notification appliance can include both visible and audible notification elements. The acoustic sensing device of such a notification appliance can be used (1) to detect the sounds emanating from the electronic circuit elements in the notification appliance that occur as a result of the visual light emission from the visible notification element, for example, the strobe light discharge and (2) to detect sound output of the audible notification element, including the sound that is within or outside of the humanly audible frequency range. In these embodiments, the acoustic sensing device can be coupled to one or more audio filters and/or to one or more differentiated timing mechanisms.

In some embodiments, the visible and/or audible notification appliance disclosed herein can include a communications device and/or interface for providing an indication that the notification appliance tested successfully. For example, the communications device can include a visual or audible indicator associated with the notification appliance. Additionally or alternatively, the communications device can include interface circuitry for transmitting a signal indicative of the successful testing to a control panel and/or central monitoring station of a security or fire system of which the notification appliance is a part.

In some embodiments, the notification appliance disclosed herein can execute an operational test whenever the notification appliance is activated, whenever the notification appliance receives a manual or automated command from an ambient security or fire system to execute the operational test, and/or whenever the notification appliance receives a manual or automated command input from a control local to the notification appliance.

In some embodiments, the notification appliance disclosed herein can include threshold detection circuitry and/or circuitry for analyzing and/or identifying phenomenon signatures. For example, in some embodiments, the circuitry of the notification appliance disclosed herein can distinguish a desired visual device operation and output, such as the strobe light flash, from a short circuit or other fault and/or can distinguish a desired audio operation and output from abnormal audio operation and output.

FIG. 1 is a block diagram of a notification appliance 100 in accordance with disclosed embodiments. As seen in FIG. 1, the notification appliance 100 can include a housing 105, one or more visual indicators 110, such as a strobe light, one or more audio indicators 120, such as an audio transducer, one or more monitoring sensors 130 as disclosed herein, a microphone 140 for receiving sound from other notification appliances in an acoustic region, and/or a communications device and/or interface 150 as disclosed herein. For example, as seen in FIG. 1, the communications device and/or interface 150 can communicate with a remote device 160 for transmission of a signal indicative of the results of an operational test of the notification appliance 100.

Figure 2:
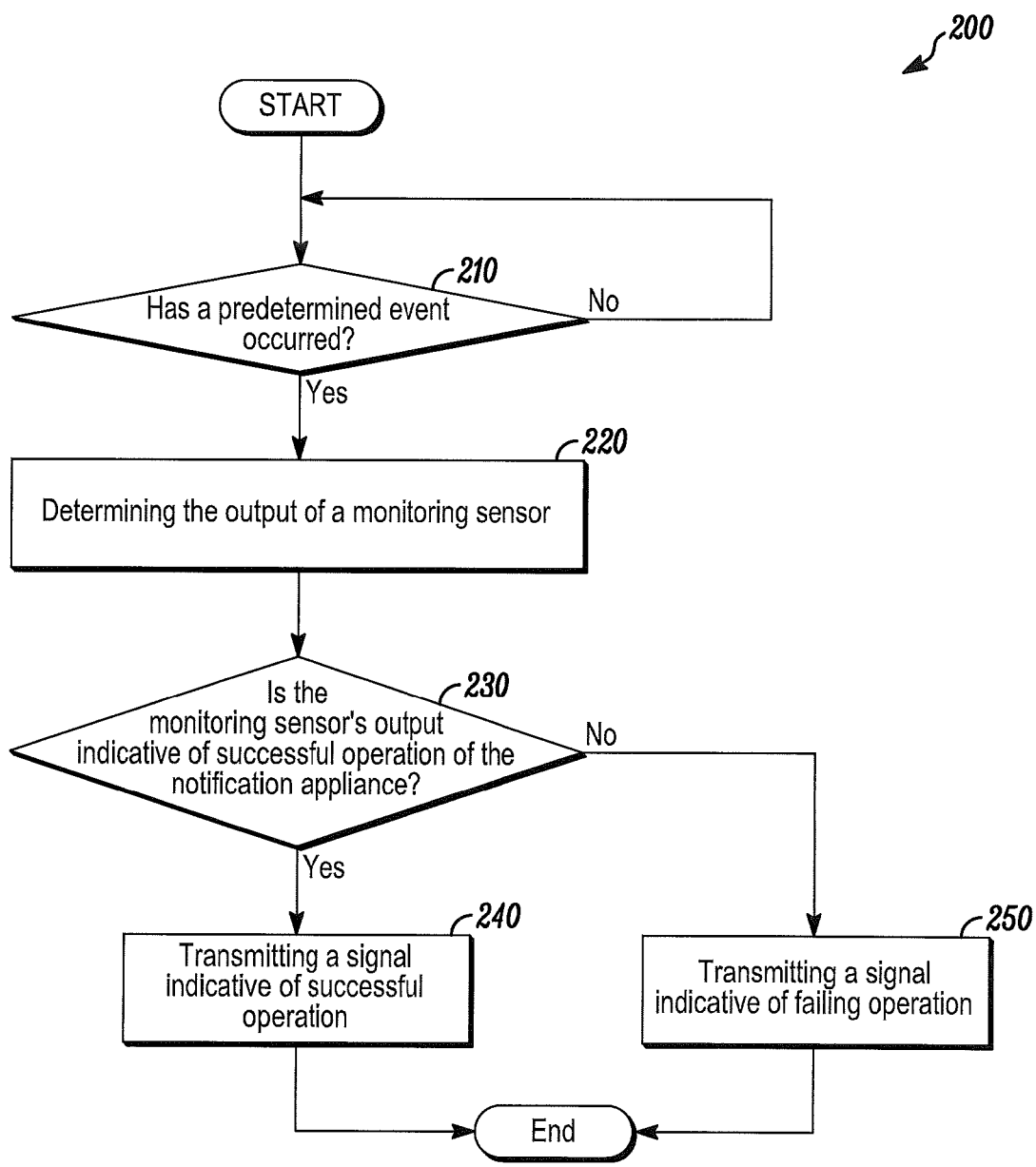
FIG. 2 is a flow diagram of a method of executing an operational test of a notification appliance in accordance with disclosed embodiments.

FIG. 2 is a flow diagram of a method 200 of executing an operational test of a notification appliance, for example, the notification appliance 100, in accordance with disclosed embodiments. As seen in FIG. 2, upon detection of the occurrence of a predetermined event as in 210, the method 200 can include determining the output of a monitoring sensor, for example, the monitoring sensor 130, as in 220. In some embodiments, determining the output of the monitoring sensor can also include activating the monitoring sensor and/or instructing the monitoring sensor to make a reading.

The method 200 can include determining whether the monitoring sensor's output is indicative of successful operation of the notification appliance as in 230. If so, then the method 200 can include transmitting a signal, locally and/or remotely, indicative of the successful operation as in 240. However, if the monitoring sensor's output is not indicative of the successful operation of the notification appliance as in 230, then the method 200 can include transmitting a signal, locally and/or remotely, indicative of a failing operation as in 250.

It is to be understood that the method 200 shown in FIG. 2 and others in accordance with disclosed embodiments can be executed and/or controlled by control circuitry that is part of and/or separate from circuitry in the monitoring sensor 130 of the notification appliance 100. In some embodiments, the control circuitry can be local to the notification appliance 100, and in some embodiments, the control circuitry can be remote from the notification appliance 100.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A system comprising:
a first notification device; and
a monitoring sensing device,
wherein the first notification device produces an acoustic signal,
wherein the monitoring sensing device senses a first sound pressure level of the acoustic signal and compares the first sound pressure level of the acoustic signal to an ambient sound pressure level to determine successful operation of the first notification device,
wherein the acoustic signal produced by the first notification device is audibly undetectable by a user, and
wherein the monitoring sensing device senses an audio output of a second notification device.

2. The system of claim 1 wherein the first notification device includes an audible notification device, and wherein the monitoring sensing device includes an acoustic sensing device.

3. The system of claim 1 wherein the first notification device includes an audible notification device, and wherein the monitoring sensing device includes an acoustic sensing device.

4. A method comprising:
determining an occurrence of a predetermined event;
upon the occurrence of the predetermined event, determining an output of a monitoring sensing device; and
determining whether the output of the monitoring sensing device is indicative of successful operation of a first notification device,
wherein determining the output of the monitoring sensing device includes determining results of the monitoring sensing device sensing a first sound pressure level of an acoustic signal produced by the first notification device and comparing the first sound pressure level of the acoustic signal to an ambient sound pressure level,
wherein the acoustic signal produced by the first notification device is audibly undetectable by a user, and
wherein the monitoring sensing device senses an audio output of a second notification device.

5. The method of claim 4 wherein determining the output of the monitoring sensing device includes determining the audio output sensed by the monitoring sensing device.

\* \* \* \* \*